United States Patent [19]
Noneman et al.

[11] Patent Number: 5,708,656
[45] Date of Patent: Jan. 13, 1998

[54] METHOD AND APPARATUS FOR PACKET DATA TRANSMISSION

[75] Inventors: John Noneman, Valley Center; Sona Kapadia, San Diego, both of Calif.; Zhi-Chun Honkasalo, Bedford, Tex.

[73] Assignee: Nokia Mobile Phones Limited

[21] Appl. No.: 712,167

[22] Filed: Sep. 11, 1996

[51] Int. Cl.$^6$ .................................................. H04J 13/00
[52] U.S. Cl. .......................... 370/320; 370/441; 370/395; 375/205
[58] Field of Search .................................. 370/395, 330, 370/331, 333, 334, 335, 389, 391, 392, 441, 448, 503, 507, 517, 538, 539, 902, 905, 908, 913, 915, 320, 324, 355, 358, 342, 349, 350, 468, 352, 405, 522; 375/200, 205, 206; 379/59, 60, 94–100; 455/56.1, 54.1, 51.1, 33.1, 38.1

[56] References Cited

U.S. PATENT DOCUMENTS

| | | | |
|---|---|---|---|
| 4,597,077 | 6/1986 | Nelson et al. | 370/352 |
| 4,679,191 | 7/1987 | Nelson et al. | 370/358 |
| 5,257,257 | 10/1993 | Chen et al. | 370/441 |

Primary Examiner—Dang Ton
Attorney, Agent, or Firm—Perman & Green,LLP

[57] ABSTRACT

In a packet data transmission and reception system two inactivity time intervals are used along with a variable data rate including an idle rate, a default or intermediate rate, and a peak rate. When no packet data is available the data rate is reduced to an idle rate to free most of the system capacity used for communicating the packet transmissions. The packet data service connection is thus maintained and the idle rate transmission of idle packets allows the receiving end of the channel to stay synchronized with the transmitter. If the packet data transmission resumes before the first inactivity timer expires the transmission rate returns immediately to the peak rate. However, if the inactivity continues until the first inactivity timer expires, the data rate is preferably not immediately returned to the peak rate. The packet data service connection is instead maintained at the idle rate after the first inactivity timer expires. When the second inactivity timer expires the packet data service is released. If packet data becomes available for transmission between the time the first inactivity timer expires and the second inactivity timer expires, the data packets are transmitted at the intermediate rate, which is generally lower than the peak rate. After the transmitting source receives an acknowledgment from the receiving end of the channel, the data rate switches back to the peak rate.

10 Claims, 4 Drawing Sheets

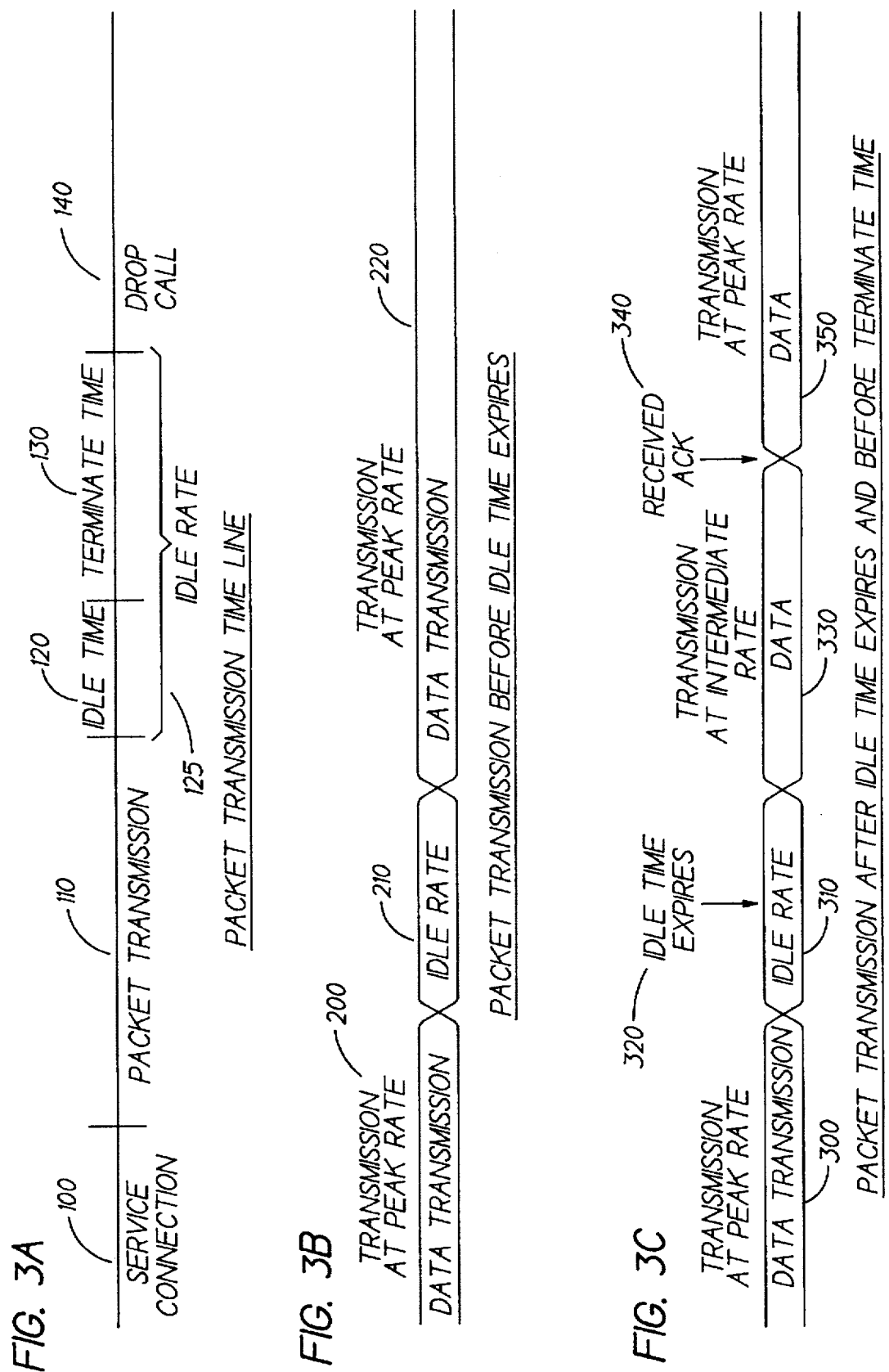

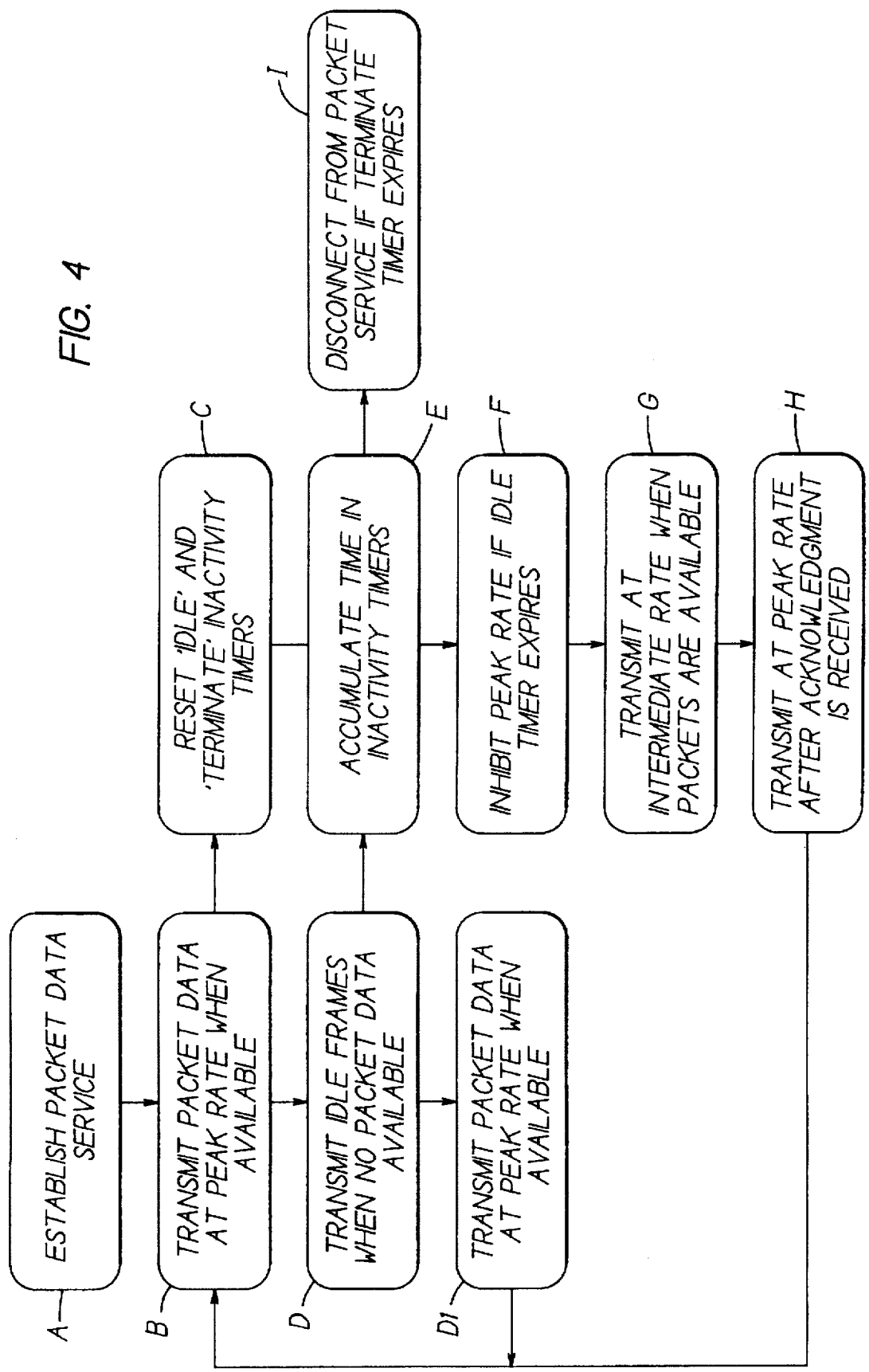

METHOD AND APPARATUS FOR PACKET DATA TRANSMISSION

BACKGROUND OF THE INVENTION

1. Field of the Invention

This invention relates to cellular telephone network data transmission, specifically to a method of packet data transmission for a connection-based packet service.

2. Prior Art

Packet data communication is known in cellular telephone systems, as is evidenced by, for example, commonly assigned U.S. Pat. No. 5,257,257, issued Oct. 26, 1993, entitled "Method of Controlling the Operation of a Packet Switched CDMA Communications Network for Controlling the Operation of Transmitters and Receivers", by X. H. Chen and J. Oksman.

One further example is defined in TIA/EIA/IS-657, Packet Data Services Option for Wideband Spread Spectrum Cellular System, incorporated herein by reference. IS-657 is used along with TIA/EIA/IS-95A, Mobile Station-Base Station Compatibility Standard for Dual-Mode Wideband Spread Spectrum Cellular System, and TIA/EIA/IS-99, Data Services Option Standard for Wideband Spread Spectrum Digital Cellular System, each of which is incorporated herein by reference.

A connection-based protocol is defined for packet data service in which a mobile station (MS) establishes a connection to a base station (BS). While the connection is established a traffic channel is used for communicating data between the MS and BS. Since the use of a traffic channel consumes some of the available system capacity it is important that the traffic channel only be used when needed. To achieve this objective IS-657 defines a packet data inactivity timer in section 2.2.4.1.1.2.4, titled Connected State. According to the standard, the inactivity timer is reset whenever a packet data frame is sent or received. When there is no packet data activity the inactivity timer accumulates a count. If the packet data inactivity timer expires, meaning that it reaches the maximum allowed time of inactivity, the MS releases the connection, thus freeing the traffic channel. Protocol layers above RLP, such as PPP, TCP/IP, etc., are maintained after the traffic channel is released until the packet data service is terminated.

A problem occurs with the approach specified in IS-657 if the packet data needed to be transmitted is available in bursts or otherwise is not continuously available for transmission. In this case the inactivity timer may frequently expire during the periods of packet unavailability, causing the MS to disconnect from the packet data service. When packet data is once again available for transmission the MS must reestablish the packet data service to transmit the packets. This presents a problem in that some amount of time is required to disconnect from the packet data service and then reestablish the packet data service. Information throughput is thus reduced. If the inactivity timer expiration time is lengthened to avoid the need to frequently connect and disconnect, system capacity is wasted during periods of packet of inactivity.

Another problem occurs in IS-657 when the data rate is high (could be higher than that defined in IS-95), where the peak rate consumes a large percentage of system capacity. In this case, the prior art approach would go from transmitting at the idle rate during the inactivity to transmitting a packet at the peak rate, and the system must reserve the capacity of the peak rate during the entire length of the inactivity timer. This is extremely prohibitive for a service which is intended to be able to transfer capacity from one packet data user to another during times of inactivity.

According to the prior art, there is no value of the inactivity expiration time that will provide optimum packet data transmission efficiency. A short inactivity expiration time will require frequent service negotiation for connections and disconnections, and a long inactivity expiration time will waste system resources. An improved method of transmitting packet data is needed to overcome this limitation of the prior art.

SUMMARY OF THE INVENTION

The foregoing and other problems are overcome in accordance with methods and apparatus in accordance with this invention. More particularly, this invention is directed to solving the problem of inefficient packet data transmission. According to the teaching of this invention two inactivity time intervals are used along with a variable data rate including an idle rate, a default or intermediate rate, and a peak rate. When no packet data is available the data rate is reduced to an idle rate to free most of the system capacity used for communicating the packet transmissions. The packet data service connection is thus maintained and the idle rate transmission of idle packets allows the receiving end of the channel to stay synchronized with the transmitter.

If the packet data transmission resumes before the first inactivity timer expires the transmission rate returns immediately to the peak rate. However, if the inactivity continues until the first inactivity timer expires, the data rate is preferably not immediately returned to the peak rate. This is because the network may allocate the free system capacity for other uses after the first inactivity timer expires. The packet data service connection is instead maintained at the idle rate after the first inactivity timer expires. When the second inactivity timer expires the packet data service is released.

If packet data becomes available for transmission between the time the first inactivity timer expires and the second inactivity timer expires, the data packets are transmitted at the intermediate rate, which is generally lower than the peak rate. After the transmitting source receives an acknowledgment from the receiving end of the channel, the data rate switches back to the peak rate. The data rate is not immediately switched back to the peak rate when packet data is available, because the network may have insufficient capacity to support the peak rate after reallocating capacity during the idle time. After an acknowledgment is received that sufficient capacity is available, the transmitting source may then use the peak rate.

The intermediate rate may be the same as the peak rate under certain capacity utilization conditions. In this case data rate switches to the peak rate directly from the idle rate without having to receive an acknowledge signal.

An object of the invention is to provide an efficient method for transmitting packet data over a cellular communication network.

Another object of the invention is to maintain a packet data service connection during brief times of packet data inactivity without wasting system capacity.

Another object of the invention is to avoid renegotiation of service between brief times of packet data inactivity.

A feature of the invention is the use of multiple inactivity timers.

Another feature of the invention is the use of a variable data rate for packet data transmissions.

Another feature of the invention is that a packet data service connection is maintained, during periods of packet data inactivity, at an idle rate.

An advantage of the invention is that packet data throughput is maximized by avoiding the overhead associated with frequent service negotiation.

Another advantage of the invention is that available system capacity is maximized by maintaining packet data connection during inactive periods at an idle rate instead of a peak rate.

BRIEF DESCRIPTION OF THE DRAWINGS

FIGS. 3A–3C illustrate a timeline of events for packet data transmission according to the present invention; and FIG. 4 illustrates a flowchart of the method of packet transmission according to the present invention.

DETAILED DESCRIPTION OF A PREFERRED EMBODIMENT

Figure 1:
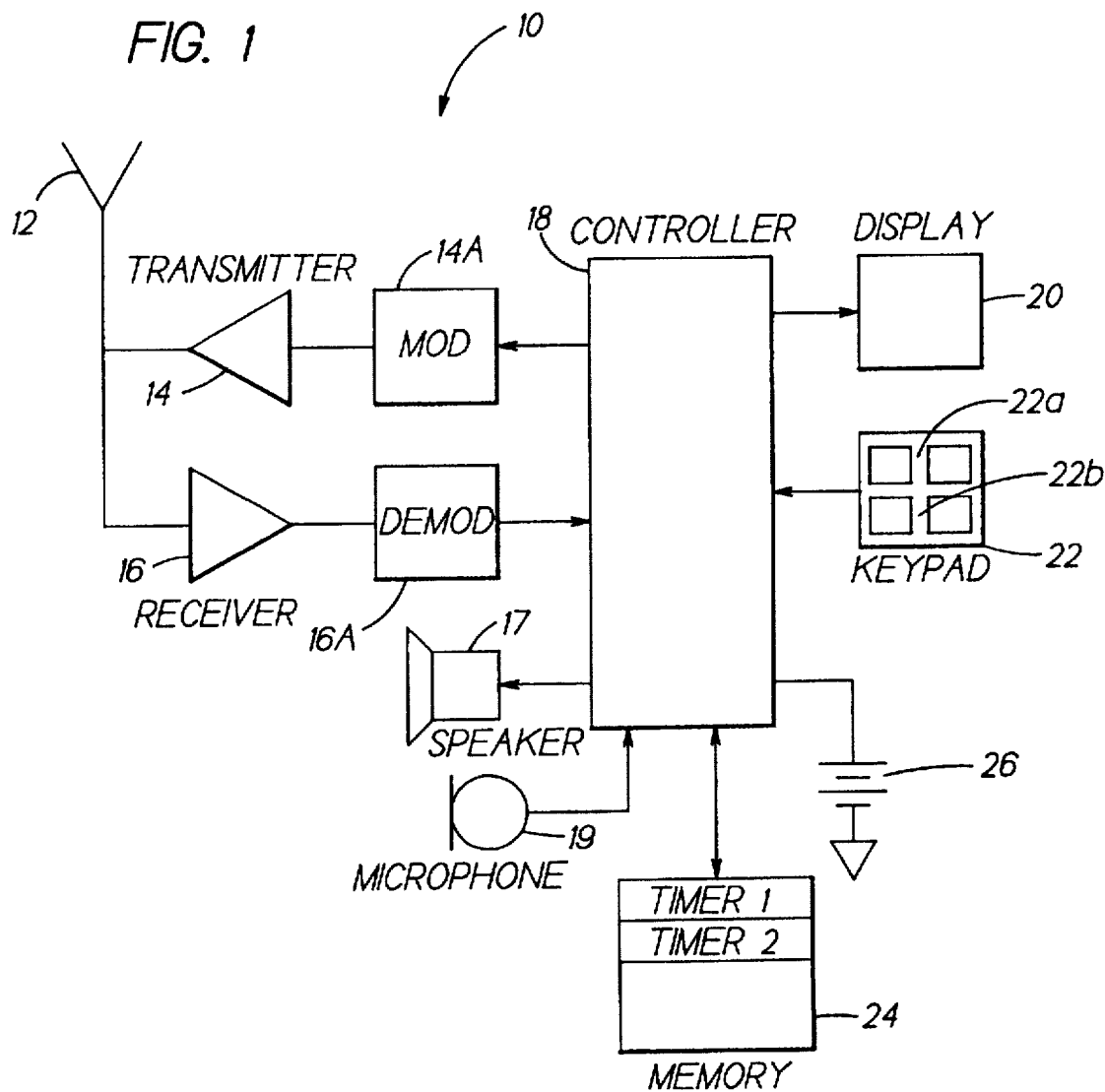
FIG. 1 is block diagram of a cellular terminal that is suitable for practicing this invention.
Figure 2:
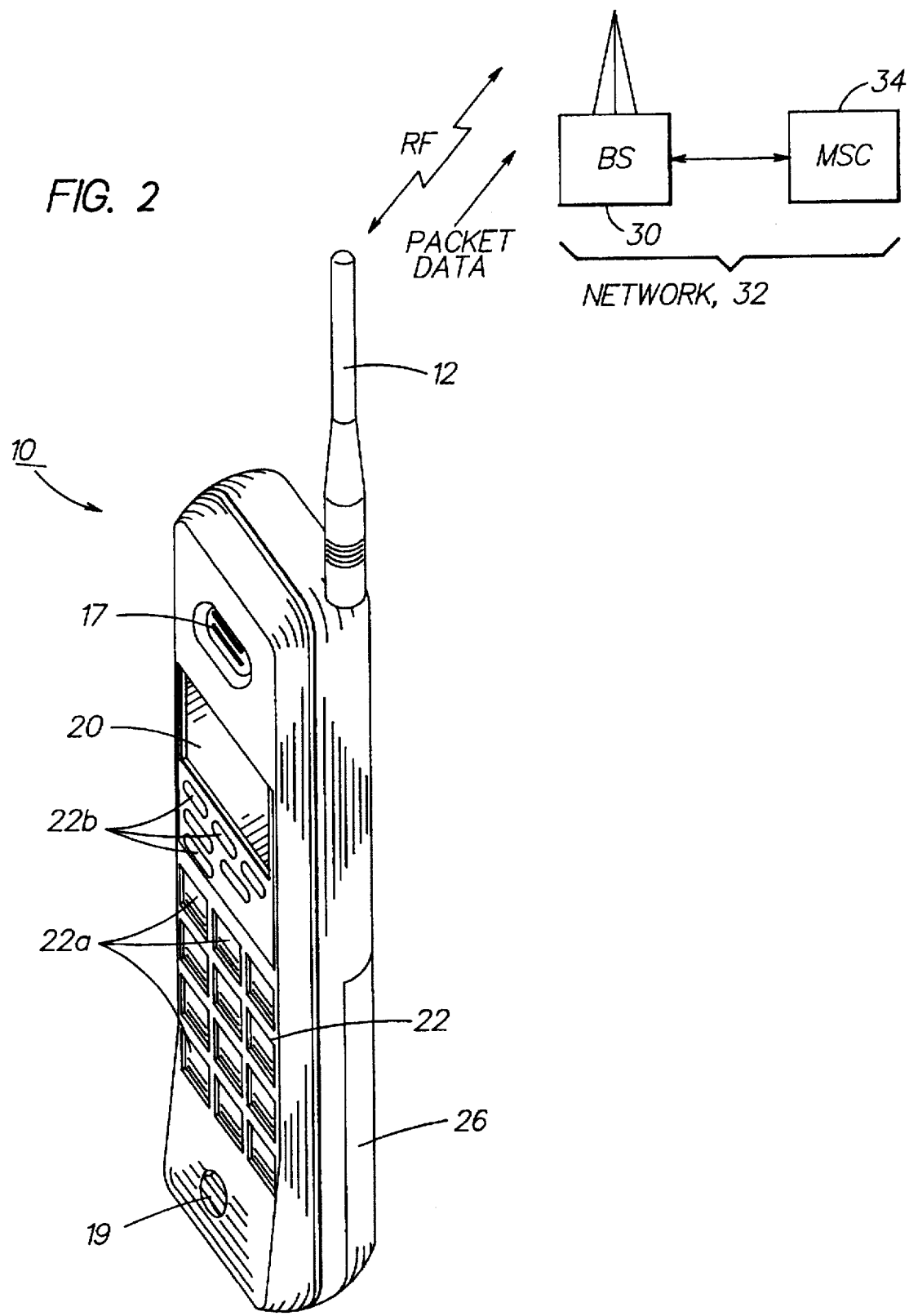
FIG. 2 depicts the terminal of FIG. 1 in communication with a cellular network.

Brief reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network 32 that includes a mobile switching center (MSC) 34. The MSC 34 provides a connection to landline trunks when the mobile station 10 is involved in a call. It is assumed for the purposes of this invention that the network 32 supports packet data service.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a capability to convey packet data.

In the presently preferred embodiment of this invention the modulator 14A, transmitter 14, receiver 16, and demodulator 16A are adapted to operate with a direct spread, code division multiple access (DS-CDMA) system, such as one specified in IS-95A. The teaching of this invention is not, however, limited for use with only this type of system, but may be employed with a number of different types of systems having different modulation and access characteristics, such as time division, multiple access (TDMA) systems.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

The mobile station 10 may be capable of voice transmissions also, and thus can include a user interface comprised of a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 may also include a battery 26 for powering the various circuits that are required to operate the mobile station.

It should be realized that in other embodiments the mobile station 10 may function only as a data terminal for at least one of transmitting or receiving packet data. As such, in this case certain of the user interface components described above may not be included. It should also be appreciated that in some embodiments the mobile station 10 may not be mobile at all, but may be operated at a fixed location (for example, as a component of a wireless facsimile machine in an office environment).

The mobile station 10 also includes various memories, shown collectively as the memory 24, wherein are stored a plurality of constants and variables that are used by the controller 18 during the operation of the mobile station.

For example, the memory 24 may store the values of various cellular system parameters and the number assignment module (NAM). An operating program for controlling the operation of controller 18 is also stored in the memory 24 (typically in a ROM device). The memory 24 may also store packet data prior to transmission or after reception. The memory 24 includes routines for implementing the method described below in relation to FIGS. 3A, 3B, 3C and 4.

Packet data service options provide a mechanism of establishing and maintaining traffic channels for packet data service. A packet data service option is negotiated during call origination or at a later time during a call. The details of establishing packet data service are well known and can be found in IS-95A, IS-657, and IS-99. To implement the invention the call origination messages are modified from the definitions in these standards to include fields to hold new parameters. Specifically, the parameters in Table I are established between the MS and BS.

TABLE I

| Parameter | Description |
| --- | --- |
| Rate Set | The set of discrete data rates used (for example, 1.2 kbps, 2.4 kbps, 4.8 kbps, 9.6 kbps, etc. form a rate set). |
| Idle Rate | The data rate when no packet data is transmitted. |
| Intermediate Rate | The data rate after an idle rate transmission. |
| Peak Rate | The maximum rate in the rate set that is usable. |
| Idle Time | The inactivity timer expiration value when the transmission rate is limited to the intermediate rate. |
| Terminate Time | The inactivity timer expiration value when packet data service is terminated. |

Any of these parameters can be negotiated when packet data service is requested, or can be made a fixed value that is associated with the packet data service.

The Rate Set can be selected from the list of available rate sets defined in IS-95A, or from additional rate sets that are defined as part of a high speed data service. The Idle Rate can be, for example, the lowest rate in the Rate Set. The Intermediate Rate can be, for example, a basic rate of the Rate Set. The Peak Rate can be the highest rate in the Rate Set, or a lower rate if limited by the capabilities of the MS 10 or the available system capacity.

The Idle Time and Terminate Time may be determined by the network loading and the characteristics of the packet data service. On a heavily loaded network with limited available capacity, the network may set the Idle Time short so that the inactive user's capacity can quickly be reallocated to an active user. The network reserves capacity to support the Intermediate Rate after the Idle Time expires. The Terminate Time is less critical because the actual capacity used is based on Idle Rate transmission, and the Intermediate Rate capacity being reserved by the network 32 is generally less than the Peak Rate.

Referring to FIG. 3A, there is illustrated an exemplary sequence of events in a packet data service call. After a packet data service is connected 100, data packets are transmitted 110 at the Peak Rate. When no packets are transmitted the rate switches automatically to the Idle Rate 125. If packet transmission does not resume before the Terminate timer expires 130, packet service is disconnected 140 or is released.

Referring to FIG. 3B, when packet transmission at the Peak Rate 200 stops, and idle frames are transmitted 210 at the Idle Rate for a period of time less than the Idle expiration time, the Peak Rate transmission 220 may resume, assuming that additional packet data becomes available for transmission.

Referring to FIG. 3C, if packet transmission at the Peak Rate 300 stops for longer than the Idle expiration time 320, then the Idle Rate 310 transitions to the Intermediate Rate 330 until an acknowledgment (ACK) 340 is received. At this time the Peak Rate transmission 350 may resume. The receipt of the ACK 340 informs the transmitter that sufficient capacity exists to support the Peak Rate Transmission.

The inactivity timers can be implemented as two timers, each with an expiration time. By example, and referring to FIG. 1, the timers can be implemented as software timers (Timer 1 and Timer 2) that are maintained in a read/write portion of the memory 24. Alternatively, a single inactivity timer can be used, wherein the timer value is compared with the Idle Time value to detect the first expiration. Then the single timer continues to count and the timer value is compared with the Terminate Time value to detect the second expiration.

Referring now to FIG. 4, which shows a flow chart of the method of the invention, packet data service is first established at Block A. Initially packets are transmitted at, by example, the Peak Rate (Block B). When a packet is transmitted the Idle and Terminate inactivity timers are reset at Block C. During times when no packets are being transmitted, one or more idle frames are transmitted at Block D at the Idle Rate, and again at the Peak Rate (D1) if packet data becomes available before the expiration of the Idle inactivity timer. In this manner the receiver of the packet data maintains synchronization with the transmitter. During the time that the Idle frames are transmitted (Block D) the inactivity timers accumulate a count (Block E). When the Idle timer has expired (Block F) further transmission at the Peak Rate is inhibited. When packet data is available and transmission begins again (Block G), the transmission rate is set at the Intermediate Rate. When an acknowledgment is received (Block H), transmission again resumes at the Peak Rate. This process continues until the packet service is terminated by a normal service termination sequence, or by the expiration of the Terminate timer at Block I.

Although described in the context of preferred embodiments, it should be realized that a number of modifications to these teachings may occur to one skilled in the art. By example, and as was discussed above, the teachings of this invention are not intended to be limited to any specific air interface standard or access scheme.

Thus, while the invention has been particularly shown and described with respect to preferred embodiments thereof, it will be understood by those skilled in the art that changes in form and details may be made therein without departing from the scope and spirit of the invention.

What is claimed is:

1. A method of transmitting packet data comprising the steps of:

establishing a packet data service connection;

transmitting the packet data at a first predetermined rate when the packet data is available;

resetting a first and a second inactivity timer when the packet data is transmitted;

transmitting at least one idle frame at a second predetermined rate when the packet data in not available;

incrementing the first and second inactivity timers when the packet data is not being transmitted;

detecting an expiration of the first inactivity timer and, in response to the detected expiration, inhibiting packet transmission at the first predetermined rate;

transmitting the packet data at a third predetermined rate when the packet data is available after detecting an expiration of the first inactivity timer, but before detecting an expiration of the second inactivity timer; and receiving an acknowledge signal and in response to the acknowledge signal transmitting the packet data at the first predetermined rate;

wherein the step of detecting an expiration of the first inactivity timer includes a further step of detecting an expiration of the second inactivity timer, if no further packet data is transmitted, and, in response to the detected expiration of the second expiration timer, releasing the packet data service.

2. The method of claim 1 wherein the first data rate is greater than the third data rate and the third data rate is greater than the second data rate.

3. A method for transmitting packet data between a packet data source and a packet data sink in a wireless transmission/reception system, comprising the steps of:

transmitting, at a first data rate, available packet data from the source to the sink over a packet data channel;

upon an occurrence of a condition wherein the packet data is not available to be transmitted, transmitting idle packet data at a second data rate from the source to the sink while running a first timer and a second timer;

while running the first timer and the second timer, and upon an occurrence of a condition wherein the packet data is again available to be transmitted, and before the first timer reaches a first predetermined value, transmitting, at the first data rate, the available packet data from the source to the sink;

while running the first timer and the second timer, and upon the occurrence of the condition wherein the packet data is again available to be transmitted, and after the first timer reaches the first predetermined value but before the second timer reaches a second predetermined value, transmitting, at a third data rate, the available packet data from the source to the sink; and while running the first timer and the second timer, and after the first timer reaches the first predetermined value and after the second timer reaches the second predetermined value, releasing the packet data channel.

4. A method as set forth in claim 3, wherein the step of transmitting the available packet data at the third data rate continues until a signal is received from the packet data sink, and, in response to the signal being received, resuming the transmission of the available packet data at the first data rate.

5. A method as set forth in claim 3, wherein the steps of transmitting occur over a direct spread, code division multiple access (DS-CDMA) packet data channel.

6. A method as set forth in claim 3, wherein the first data rate is greater than the third data rate and the third data rate is greater than the second data rate.

7. A wireless transmission/reception system providing for the transmission of packet data between a packet data source and a packet data sink, said packet data source comprising:

transmitter circuitry for transmitting, at one of a plurality of different data rates within a set of data rates, available packet data to the sink over a packet data channel;

a first timer and a second timer capable of being selectively started and reset; and a controller, said controller being coupled to said transmitter circuitry and to said timers and being responsive to an occurrence of a condition wherein the packet data is available to be transmitted, for transmitting the packet data at a first data rate, said controller being further responsive to an occurrence of a condition wherein the packet data becomes unavailable to be transmitted, for transmitting idle packet data at a second data rate while releasing a reset of the first timer and the second timer, said controller being further responsive to an occurrence of a condition wherein the packet data again becomes available to be transmitted, before the first timer reaches a first predetermined value, for transmitting, at the first data rate, the available packet data and for resetting the first timer and the second timer, said controller being further responsive to the occurrence of the condition wherein the packet data is again available to be transmitted, after the first timer reaches the first predetermined value but before the second timer reaches a second predetermined value, for transmitting, at a third data rate, the available packet data and for resetting the first timer and the second timer, and said controller being further responsive to a condition wherein the first timer reaches the first predetermined value and the second timer reaches the second predetermined value, for releasing the packet data channel.

8. A system as set forth in claim 7, wherein said controller transmits the available packet data at the third data rate until a signal is received from the packet data sink, and, in response to the signal being received, for resuming the transmission of the available packet data at the first data rate.

9. A system as set forth in claim 7, wherein said transmitter is adapted for transmitting over a direct spread, code division multiple access (DS-CDMA) packet data channel.

10. A system as set forth in claim 7, wherein the first data rate is greater than the third data rate and the third data rate is greater than the second data rate.

* * * * *